J. BUSTANOBY.
VEHICLE WHEEL.
APPLICATION FILED AUG. 18, 1908.
1,009,720.
Patented Nov. 28, 1911.
2 SHEETS—SHEET 1.
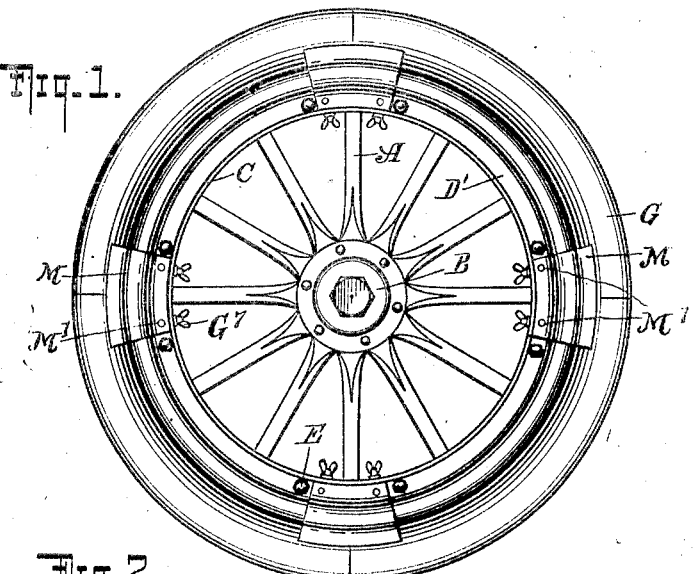
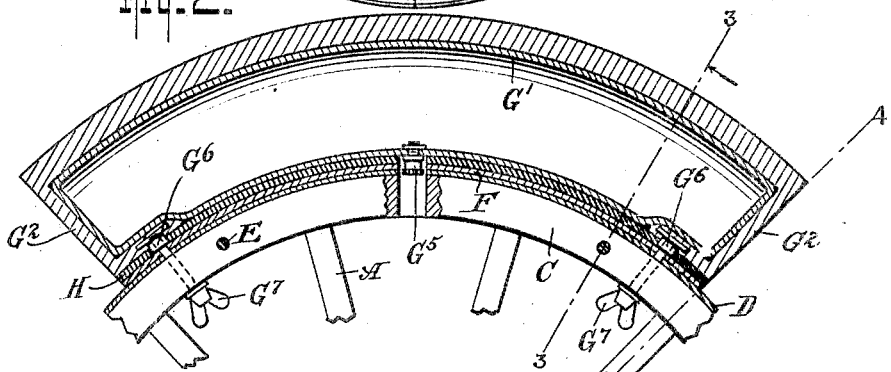
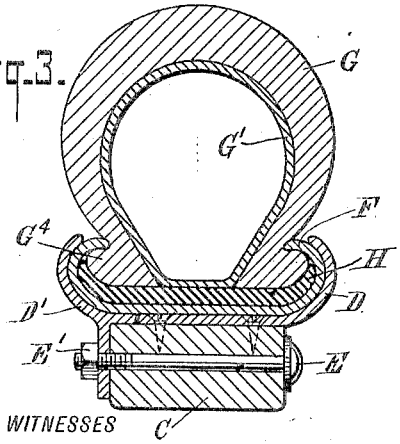
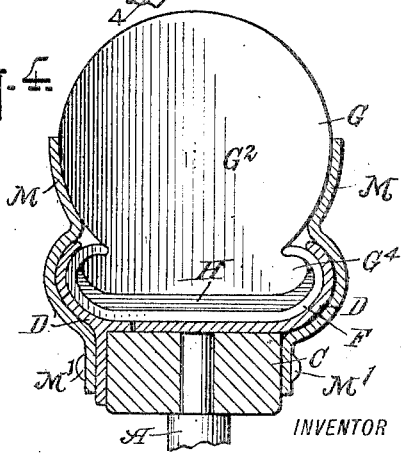
WITNESSES
INVENTOR
JACQUES BUSTANOBY
BY
ATTORNEYS

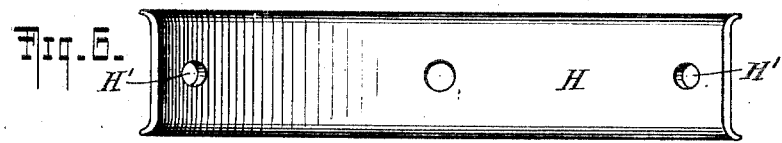
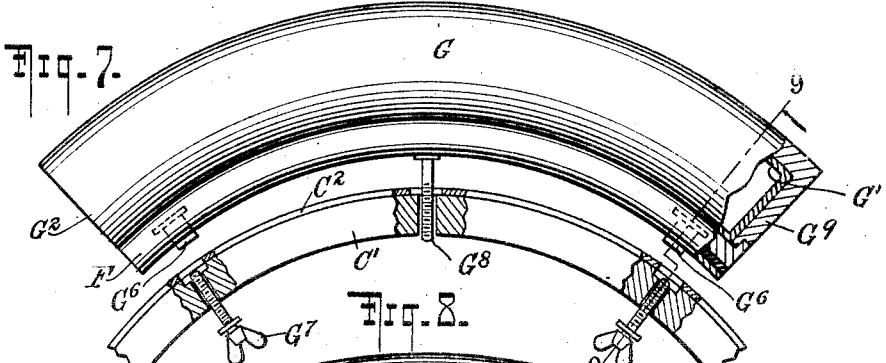
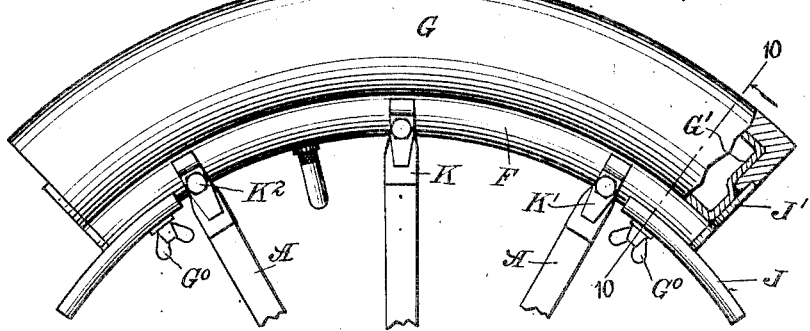
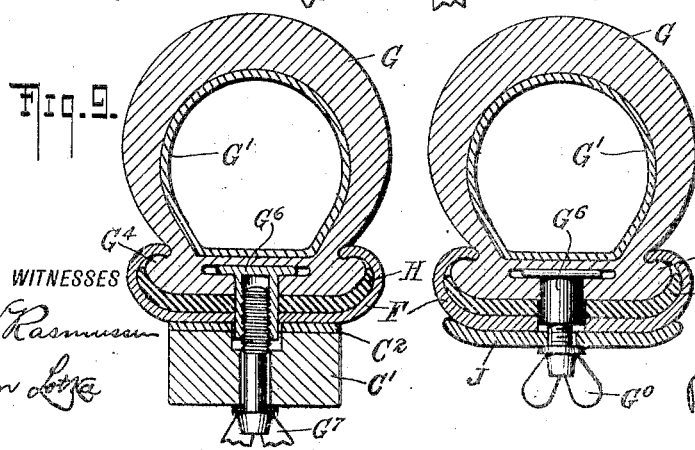

UNITED STATES PATENT OFFICE.

JACQUES BUSTANOBY, OF NEW YORK, N. Y.

VEHICLE-WHEEL.

1,009,720.  Specification of Letters Patent.  Patented Nov. 28, 1911.

Application filed August 18, 1908. Serial No. 449,011.

*To all whom it may concern:*

Be it known that I, JACQUES BUSTANOBY, a citizen of the French Republic, and resident of the borough of Manhattan, city, county, and State of New York, have invented certain new and useful Improvements in Vehicle-Wheels, of which the following is a specification.

My invention relates to vehicle wheels, and particularly such as have removable, preferably pneumatic, tires.

The object of my invention is to so construct the tire and wheel as to enable repairs to be made promptly by the removal of a damaged tire section, and the substitution of a reserve section. For this purpose I employ a sectional tire which is combined with a removable rim, the latter being also made in sections according to some forms of my invention.

In the accompanying drawings, I have illustrated several forms of my invention.

Figure 1 is an outside view of an automobile wheel, embodying my invention; Fig. 2 is a longitudinal cross section through one of the tire sections and the adjacent parts of the wheel; Fig. 3 is a cross section on line 3—3 of Fig. 2; Fig. 4 is a cross section on line 4—4 of Fig. 2; Fig. 5 is a detail view of a tire section looking from the inside; Fig. 6 is an inside view of a protector plate or shield used in this form of my invention; Fig. 7 shows the tire section slightly separated from the wheel; Fig. 8 shows my sectional tire applied to a rim detachably connected with the spokes; Fig. 9 is a cross section substantially on line 9—9 of Fig. 7; and Fig. 10 is a cross section on line 10—10 of Fig. 8.

In the form of my invention illustrated by Figs. 1-6, A indicates the spokes connected with the hub B and with the main rim C. To this main rim is permanently fastened an auxiliary rim section D, and also detachably secured a removable auxiliary rim section D'. This latter is applied on the outer face of the wheel, and may be held in position by any suitable means such as bolts E and nuts E'. The two auxiliary rim sections D D' form a peripheral channel of the well known curved shape. Between these auxiliary rim sections D D' are received the tire-carrying rim-sections F which are shorter than the circumference of the wheel. In the example illustrated by the drawings, four tire-carrying rim sections F are employed, said sections being adapted to abut against each other, and to be clamped between the auxiliary rim sections D D', the latter two being preferably continuous. Each of the sections F forms a channel contracted toward its opening in substantially the form now generally used for automobile wheels, and each channel or tire-carrying section F is connected in a more or less permanent way with a corresponding tire section. This tire section comprises a shoe or case G, and an air tube or air chamber G'. In Figs. 1-5, the ends of the shoe are closed up walls $G^2$, against which the ends of the air chamber G' are fitted when inflated. For the purpose of introducing the air chamber within the case G, the latter is provided upon its inner surface with a longitudinal slot $G^3$ (see Fig. 5). The case is also formed with hooks $G^4$ to engage with the inwardly bent ends of the tire-carrying section F. $G^5$ indicates the cap of the inflating valve, which cap may be accessible through an opening in the various rim sections, although it is not absolutely necessary that this cap should be accessible. To hold the tire sections and the carrier sections F positively against creeping lengthwise of the wheel, I have embedded screw threaded sockets $G^6$ in each end of the case G, these sockets being received in suitable openings H' of a protector or shield H, which I prefer to interpose between the tire and the outer surface of the tire-carrying section F. These sockets $G^6$ are adapted to be engaged by bolts $G^7$, provided with wing heads, so that they may be readily manipulated and extending through suitable apertures of the rim parts. It is to be understood that while these sockets are to be preferred, they are not absolutely necessary. The shield H has its ends curved to fit between the hooks $G^4$ and the curved edges of the channel or rim portions F. The central portion of the shield is flat in a transverse direction, and engages not only the case or shoe G, but also a portion of the air chamber or inner tube G'. An automobilist would carry an extra supply of tire sections G G' connected with their respective rim sections F and shields H. Should any one of the tire sections on the wheel be punctured, the wheel will be turned until such damaged section is clear of the ground, and then the rim section D' would be removed, allowing the damaged tire section, together with its carrying section F, to be withdrawn either laterally, that is, parallel with the wheel's axis, or radially outward, if preferred, after first removing the bolts G⁷ which hold such section. A fresh section would then be substituted, the bolts G⁷ attached thereto and the rim section D' again applied, whereupon the automobile will be ready to proceed. It will be observed that with this construction it is absolutely unnecessary to jack up the axle of the injured wheel in order to effect the repairs or exchange. It therefore will require but little time to substitute a reserve tire section for an injured one. Repairs can be made to the injured tire section whenever sufficient leisure exists for this purpose, the air chamber G' being simply deflated and then removed through the slot G³ by pulling on the valve stem. Owing to the shortness of the sockets G⁶ and of the valve stem $g$, in the construction shown best in Fig. 2, it is possible to remove the shoe section G from the tire-carrying section F by sliding it lengthwise of said section F, after the latter has been removed from the wheel. Of course, the tire section G, G' may also be removed from the carrying section F by a transverse outward movement.

In the form of construction illustrated by Figs. 7 and 9, the rim sections D D' have been omitted, the main rim C', which may be made of wood, carries permanently a metal rim C², and on this is applied directly the tire-carrying rim section F, which, together with the tire, may be constructed in exactly the same way as before described and secured on the main rim by means of the screw bolts G⁷ engaging sockets G⁶. In Fig. 7 I have shown a long valve stem G⁸ adapted to project to the inside of the main rim. In Fig. 7 I have also illustrated a construction in which the outer case G is closed by an end wall G² only at one end, the other end being open for the insertion of the air chamber, and being adapted to be closed by a flap G⁹, loosely connected with the case at one end, so that said flap may swing on a hinge, as it were, or, as shown in Fig. 8, the open end of the outer case may be closed when the tire section is in its operative position, by a plate J' projected from a clamp or holding member J, which bridges the joint between two adjacent tire carrying sections F, and is secured thereto by means of bolts G⁰ similar to the bolts G⁷ (see also Fig. 10).

In Fig. 8 the tire-carrying rim sections F are secured directly to suitable forked members K located at the outer ends of the spokes A. One end of each forked member is permanently secured to the respective spoke, but the other member K' is arranged to swing about an axis K² parallel with the wheel's axis, so that by folding down this member or end K' the tire-carrying section F may be released. I am aware that this construction for connecting the spokes of a wheel with the rim is not novel, broadly, although it has never been applied, so far as I know, to a sectional rim of the character herein set forth.

The preferred way of removing a tire-section from the tire-carrying section would be to slide the tire-section lengthwise of the carrying-section F.

To maintain the ends of adjacent tire sections in position I may provide holding members M (Figs. 1 and 4) which are secured to opposite sides of the wheel rim as at M' and extend upwardly on opposite sides of the tire sections at their joints or points of engagement. The tire sections are thus held in alinement and the ends thereof are prevented from moving in a direction parallel with the axis of the wheel. The holding members extend only partly to the periphery of the tire section so as not to engage the road when a load is applied to the wheel.

I claim:

1. In a wheel, a central body, in combination with a rim made of channeled segments each detachable individually from said body, tire sections each fitted to one of the rim segments, and a shield interposed between each rim segment and the corresponding tire section, the edges of the shields being located within the curved channel-forming edges of the rim segments.

2. In a wheel, a central body, in combination with a rim made of channeled segments each detachable individually from said body, tire sections each fitted to one of the rim segments, and a shield interposed between each rim segment and the corresponding tire section, the central portion of each shield being flat transversely while its edges are curved and fitted within the curved channel-forming edges of the rim segments.

3. In a wheel, a central body, in combination with a rim made of channeled segments each detachable individually from said body, tire sections each fitted to one of the rim segments, and a shield interposed between each rim segment and the corresponding tire section, the edges of each shield being curved and fitted within the curved channel-forming edges of the rim segments.

4. In a wheel, an annular rim section removable axially, a mating stationary rim section, rim segments alined endwise and adapted to be clamped between said rim sections, said segments being of uniform interior cross section from end to end, and tire sections carried by said rim segments and removable therefrom by sliding them lengthwise of the segments.

5. In a wheel a body, a series of rim segments carried by the body and alined endwise, tire sections each provided with short securing devices, a shield interposed between each tire section and the corresponding rim segment and provided with apertures to receive the projecting ends of said securing devices, and companion securing devices carried by the body and adapted for coöperation with those on the tire sections.

In testimony whereof I have signed this specification in the presence of two subscribing witnesses.

JACQUES BUSTANOBY.

Witnesses:
JOHN A. KEHLENBECK,
JOHN LOTKA.